(12) United States Patent
Chen et al.

(10) Patent No.: US 12,424,362 B2
(45) Date of Patent: Sep. 23, 2025

(54) M-TYPE HEXAFERRITE HAVING A PLANAR ANISOTROPY

(71) Applicant: ROGERS CORPORATION, Chandler, AZ (US)

(72) Inventors: Yajie Chen, Burlington, MA (US); Yu Wang, Malden, MA (US)

(73) Assignee: ROGERS CORPORATION, Chandler, AZ (US)

( * ) Notice: Subject to any disclaimer, the term of this patent is extended or adjusted under 35 U.S.C. 154(b) by 345 days.

(21) Appl. No.: 17/923,127

(22) PCT Filed: May 6, 2021

(86) PCT No.: PCT/US2021/031006
§ 371 (c)(1),
(2) Date: Nov. 3, 2022

(87) PCT Pub. No.: WO2021/226297
PCT Pub. Date: Nov. 11, 2021

(65) Prior Publication Data
US 2023/0352223 A1    Nov. 2, 2023

Related U.S. Application Data

(60) Provisional application No. 63/021,295, filed on May 7, 2020.

(51) Int. Cl.
| | | |
|---|---|---|
| *H01F 1/34* | (2006.01) | |
| *C01G 49/00* | (2006.01) | |
| *C04B 35/26* | (2006.01) | |
| *C04B 35/626* | (2006.01) | |
| *C04B 41/00* | (2006.01) | |
| *H01F 1/10* | (2006.01) | |
| *H01F 1/113* | (2006.01) | |

(52) U.S. Cl.
CPC .......... *H01F 1/348* (2013.01); *C01G 49/009* (2013.01); *C04B 35/2633* (2013.01); *C04B 35/6261* (2013.01); *C04B 35/62645* (2013.01); *C04B 41/0072* (2013.01); *H01F 1/10* (2013.01); *H01F 1/113* (2013.01); *C04B 2235/3213* (2013.01); *C04B 2235/3215* (2013.01); *C04B 2235/3224* (2013.01); *C04B 2235/3232* (2013.01); *C04B 2235/3244* (2013.01); *C04B 2235/3275* (2013.01); *C04B 2235/3286* (2013.01); *C04B 2235/3296* (2013.01); *C04B 2235/767* (2013.01); *C04B 2235/786* (2013.01)

(58) Field of Classification Search
CPC ......... H01F 1/10; H01F 1/113; C01G 49/009; C04B 35/2633; C04B 35/6261; C04B 35/62645; C04B 41/0072; C04B 2235/3213; C04B 2235/3215; C04B 2235/3232; C04B 2235/3244; C04B 2235/3272; C04B 2235/3274; C04B 2235/3275; C04B 2235/767; C04B 2235/96; C04B 2235/3296; C04B 2235/3286; C04B 2235/3224; C04B 2235/32; C04B 2235/31; C04B 2235/786
See application file for complete search history.

(56) References Cited

U.S. PATENT DOCUMENTS

| | | | |
|---|---|---|---|
| 3,020,426 | A | 2/1962 | Van Der Burgt |
| 3,036,007 | A | 5/1962 | Buykx et al. |
| 4,569,775 | A | 2/1986 | Kubo et al. |
| 4,664,831 | A | 5/1987 | Hibst et al. |
| 4,957,812 | A | 9/1990 | Aoki et al. |
| 5,110,651 | A | 5/1992 | Massard et al. |
| 5,452,167 | A | 9/1995 | Nago |
| 5,494,749 | A | 2/1996 | Kubo et al. |
| 5,591,276 | A | 1/1997 | Yoshizawa et al. |
| 5,593,612 | A | 1/1997 | Lubitz |
| 5,616,414 | A | 4/1997 | Hopstock et al. |
| 6,071,430 | A | 6/2000 | Lebourgeois et al. |
| 6,436,307 | B1 | 8/2002 | Lebourgeois et al. |
| 6,736,990 | B2 | 5/2004 | Aoki et al. |
| 7,348,374 | B2 | 3/2008 | Martinazzo |

(Continued)

FOREIGN PATENT DOCUMENTS

| | | |
|---|---|---|
| CN | 101723654 A | 6/2010 |
| CN | 102486655 A | 6/2012 |

(Continued)

OTHER PUBLICATIONS

Faouri et al., "High quality factor cold sintered Li2MoO4-BaFe12O19 composites for microwave applications," Mar. 2019, Acta Materialia, vol. 166, pp. 202-207.

(Continued)

*Primary Examiner* — C Melissa Koslow
(74) *Attorney, Agent, or Firm* — CANTOR COLBURN LLP (57) ABSTRACT

In an aspect, an M-type ferrite comprises an element Me comprising at least one of Ba, Sr, or Pb; an element Me' comprising at least one of Ti, Zr, Ru, or Ir; and an element Me" comprising at least one of In or Sc. In another aspect, a method of making the M-type ferrite can comprise milling ferrite precursor compounds comprising oxides of at least Co, Fe, Me, Me', and Me" to form an oxide mixture; wherein Me comprises at least one of Ba, Sr, or Pb; Me' is at least one of Ti, Zr, Ru, or Ir; and Me" is at least one of In or Sc; and calcining the oxide mixture in an oxygen or air atmosphere to form the ferrite.

22 Claims, 1 Drawing Sheet

(56) References Cited

U.S. PATENT DOCUMENTS

| | | | |
|---|---|---|---|
| 7,482,977 | B2 | 1/2009 | Kuroda et al. |
| 8,263,224 | B2 | 9/2012 | Tokiwa |
| 8,305,281 | B2 | 11/2012 | Suetsuna et al. |
| 8,758,721 | B2 | 6/2014 | Hill |
| 10,071,421 | B2 | 9/2018 | Suetsuna et al. |
| 10,090,088 | B2 | 10/2018 | Suetsuna et al. |
| 10,468,169 | B2 | 11/2019 | Chen et al. |
| 10,766,786 | B2 | 9/2020 | Chen et al. |
| 2002/0050309 | A1 | 5/2002 | Marusawa |
| 2003/0052298 | A1 | 3/2003 | Wang et al. |
| 2003/0091841 | A1 | 5/2003 | Marusawa |
| 2004/0054029 | A1 | 3/2004 | Fujiki et al. |
| 2007/0231614 | A1 | 10/2007 | Kondo et al. |
| 2009/0057606 | A1 | 3/2009 | Tada et al. |
| 2009/0101873 | A1 | 4/2009 | Tan et al. |
| 2010/0060539 | A1 | 3/2010 | Suetsuna et al. |
| 2010/0068512 | A1 | 3/2010 | Imaoka et al. |
| 2011/0147643 | A1 | 6/2011 | Ryou et al. |
| 2012/0049100 | A1 | 3/2012 | Yonetsu et al. |
| 2012/0068103 | A1 | 3/2012 | Hill et al. |
| 2012/0085963 | A1* | 4/2012 | An ............ C01G 49/0018 252/62.63 |
| 2012/0229354 | A1 | 9/2012 | Ishikura et al. |
| 2013/0292602 | A1 | 11/2013 | Hill |
| 2014/0264145 | A1 | 9/2014 | Ray et al. |
| 2014/0291571 | A1 | 10/2014 | Riden |
| 2014/0346387 | A1 | 11/2014 | Hill et al. |
| 2015/0310971 | A1 | 10/2015 | Kmetz et al. |
| 2016/0086700 | A1 | 3/2016 | Suetsuna et al. |
| 2016/0086728 | A1 | 3/2016 | Suetsuna et al. |
| 2016/0118171 | A1 | 4/2016 | Hill |
| 2016/0276072 | A1 | 9/2016 | Sethumadhavan et al. |
| 2017/0098885 | A1 | 4/2017 | Hill et al. |
| 2017/0213628 | A1 | 7/2017 | Chen et al. |
| 2019/0040226 | A1 | 2/2019 | Aga et al. |
| 2019/0081377 | A1 | 3/2019 | Hill et al. |
| 2019/0264005 | A1 | 8/2019 | Horn et al. |
| 2019/0300379 | A1 | 10/2019 | Kojima et al. |
| 2019/0318858 | A1 | 10/2019 | Chen et al. |
| 2021/0065943 | A1 | 3/2021 | Zhang et al. |
| 2021/0179442 | A1 | 6/2021 | Chen et al. |
| 2021/0225566 | A1 | 7/2021 | Zhang et al. |
| 2022/0367093 | A1 | 11/2022 | Chen et al. |
| 2022/0367094 | A1 | 11/2022 | Chen et al. |
| 2023/0352221 | A1 | 11/2023 | Chen et al. |
| 2023/0352222 | A1 | 11/2023 | Chen et al. |
| 2023/0399237 | A1 | 12/2023 | Chen et al. |

FOREIGN PATENT DOCUMENTS

| | | | |
|---|---|---|---|
| CN | 104379537 | A | 2/2015 |
| DE | 3907220 | | 9/1990 |
| EP | 0620571 | A2 | 10/1994 |
| EP | 0884740 | A1 | 12/1998 |
| EP | 0905718 | A1 | 3/1999 |
| EP | 1541641 | A1 | 6/2005 |
| EP | 1652829 | A2 | 5/2006 |
| EP | 2028663 | A1 | 2/2009 |
| EP | 2214180 | A1 | 8/2010 |
| EP | 2784044 | A1 | 10/2014 |
| EP | 3012843 | A1 | 4/2016 |
| JP | S62-1149 | * | 1/1987 |
| JP | S621149 | A | 1/1987 |
| JP | S6245005 | A | 2/1987 |
| JP | 62216922 | A | 9/1987 |
| JP | S62-216922 | * | 9/1987 |
| JP | S64-89504 | * | 4/1989 |
| JP | H01200605 | A | 8/1989 |
| JP | H02120237 | A | 5/1990 |
| JP | H05101930 | A | 4/1993 |
| JP | H0615411 | B2 | 3/1994 |
| JP | H09167703 | | 6/1997 |
| JP | H09213513 | A | 8/1997 |
| JP | H09232123 | A | 9/1997 |
| JP | 2000235916 | A | 8/2000 |
| JP | 2000277973 | | 10/2000 |
| JP | 2001085210 | A | 3/2001 |
| JP | 2009105365 | A | 5/2009 |
| JP | 2009155545 | A | 7/2009 |
| JP | 2017037999 | A | 2/2017 |
| JP | 6534418 | B2 | 6/2019 |
| TW | M417764 | U | 12/2011 |
| WO | 9600454 | A1 | 1/1996 |
| WO | 2011081399 | A2 | 7/2011 |
| WO | 2012103020 | A2 | 8/2012 |
| WO | 2016064459 | | 4/2016 |
| WO | 2016123598 | A1 | 8/2016 |
| WO | 2017068444 | | 4/2017 |
| WO | 2018043943 | A1 | 3/2018 |
| WO | 2020162295 | A1 | 8/2020 |
| WO | 2021061599 | A1 | 4/2021 |
| WO | 2021162886 | A1 | 8/2021 |

OTHER PUBLICATIONS

Li, Qifan, et al. "Emerging magnetodielectric materials for 5G communications: 18H hexaferrites," Acta Materialia 231 (2022) 117854 Elsevier Ltd., 10 pages.

Allia et al.; "Fe3O4 nanoparticles and nanocomposites and potential application in biomedicine and in communication technologies: Nanoparticle aggregation, interaction, and effective magnetic anisotropy"; J. of Applied Physics 116; 113903 (2014) 10 pages.

Aoyama et al.; "Preparation and Characterization of Z-type Hexaferrites, Ba3(1-x)Sr3xCo2Fe24O41 with x=0-0.5, via a two-step calcination with an intermediate wet milling"; J.Electroceram; 17; pp. 61-64 (2006).

Bid et al.; "Microstructure Characterization of Mechanosynthesized Nanocrystalling NiFe2O4 by Rietveld's Analysis"; Physica E 39; pp. 175-184; (2007).

Bierlich et al., "Low-temperature sintering and magnetic properties of Sc- and In-substituted M-type hexagonal barium ferrites for microwave applications", Abstract, Feb. 2017 Materials Research Bulletin 86:19-23 ;11 pages.

Boix, Rafael R., et al., "Characteristics of Aperture Coupled Microstrip Antennas on Magnetized Ferrite Substrates", IEEE Transactions on Antennas and Propagation, vol. 53, No. 6, (Jun. 1, 2005), pp. 1957-1966.

Brockman et al. "Nickel-Zinc Ferrite: I, Effect of Composition on the Magnetic Proprties of a Nickel-Zinc-(Cobalt) Ferrite", Journal of the American Ceramic Society, vol. 53, No. 9, Sep. 1, 1970; pp. 517-520.

Cao et al. "Hydrogen-Induced Lateral Growth of Nickel Coating on Ba3Co2Fe24O4 (Co2Z-Based Hexaferrite during the Electroplating of Multilayer Chip Inductors," Journal of The Electrochemical Society, 2002, vol. 149 Issue 12, pp. J89-J92.

Chicinas, I.; "Soft Magnetic Nanocrystalline Powders Produced by Mechanical Alloying Routes"; Journal of Optoelectronics and Advanced Materials; 8(2); pp. 439-448; (2006).

Cruz-Montoya et al., "Synthesis and characterization of polymer nanocomposites containing magnetic nanoparticles"; Journal of Applied Physics 107; 09B506 (2010); 4 pgs.

Dedi et al., "Magnetic properties of cobalt ferrite synthesized by mechanical alloying", AIP Conference Proceedings, 1964; 020003 2018; 5 pages.

Deng, et al.; Effect of Bi and Mo Doping on Magnetic and Sintered Characteristics of MgCuZn Ferrite, Journal of Inorganic Materials, 2008, pp. 670-672, vol. 23 No. 4.

EP Supplemental Search Report; EP Application No. 15853114; Mailed Nov. 21, 2017; 8 pages.

Guo et al. Abstract of "Magnetic Properties of Ir4+ Doped Co2 Z Type Hexagonal Ferrites," Journal of Rare Earths, pp. 220-222, vol. 25, Supplement 2, Jun. 2007; 7 pgs.

Haijun et al., "The preparation and microwave properties of Ba3ZnzCo2—zFe24O41 ferrite by citrate sol-gel process", Materials Science and Engineering, B84, 2001, pp. 252-257.

Han et al.; "Microwave-absorption properties of Fe(Mn)/ferrite nanocapsules"; J. Phys. D: Appl. Phys. 42; (2009) 5 pages.

(56) References Cited

OTHER PUBLICATIONS

Hansen et al., "Antennas with Magneto-Dielectrics", Microwave and Optical Technology Letters, vol. 26, No. 2, Jul. 2000, pp. 75-78.
Huang et al; "Magnetic epoxy nanocomposites with superparamegnetic MnFe2O4 nanoparticles"; AIP Advance 5; 097183 (2015); 16 pgs.
Ismail et al.; "Magnetic Properties of Mechanically Alloyed Cobalt-Zinc Ferrite Nanoparticles"; J. Supercond Nov Magn; 27; pp. 1293-1298; (2014).
Kim et al., "Effects of in3+ site occupancy on the magnetic properties of M-type strontium hexaferrites", AIB Advances 10, 015040 (2020); https://doi.org/10.1063/1.5130073; 5 pages.
Koch, C. C.; "Materials Synthesis by Mechanical Alloying"; Annu. Rev. MaterSci. 19; pp. 121-143; (1989).
Koch, C.C.; "Intermetallic Matrix Composites Prepared by Mechanical Alloying—a Review"; Materials Science and Engineering: A244; pp. 39-48; (1998).
Kong et al., "Ni—Zn Ferrites Composites With Almost Equal Values of Permeability and Permittivity for Low-Frequency Antenna Design," IEEE Transactions on Magnetics, Jan. 2007, pp. 6-9, vol. 43, No. 1.
Lee et al., "Low Loss Co2Z (Ba3Co2Fe24O41)-Glass Composite for Gigahertz Antenna Application," Journal of Applies Physics, 2011, vol. 109, 07E530-2.
Li et al.; "Microstructure effects on shock-induced surface jetting"; Journal of Applied Physics 115; 073504 (2014); pp. 11.
Li, Jie, et al. "Structural and magnetic properties of M—Ti (M=Ni or Zn) co-substituted M-type barium ferrite by a novel sintering process," Journal of Materials Science: Materials in Electronics. Chapman and Hall, London, GB; vol. 26; No. 2; Nov. 15, 2014, pp. 1060-1065.
Liu et al.; "Corrigendum: Electromagnetic-wave-absorption properties of wire-like structures self-assembled by FeCo nanocapsules"; J. Phys. D: Appl. Phys. 45; (2012); 7 pages.
Lui, Chaocheng, et al. "Characterizations of magnetic transition behavior and electromagnetic properties of Co—Ti co-substituted SrM-based hexaferrites SrCoxTixFe12—2xO19 compounds," Journal of Alloys and Compounds, vol. 784, Jan. 11, 2019, pp. 1175-1186.
Mahmood, Sami H., et al. "Modification of the Magnetic Properties of Co2Y Hexaferrites by Divalent and Trivalent Metal Substitutions," Solid State Phenomena, vol. 241; Oct. 2015, pp. 93-125.
Mattel et al., "Magnetic and dielectric properties in the UHF frequency band of half-dense Ni—Zn—Co ferrites ceramics with Fe-excess and Fe-deficiency", Journal of Magnetism and Magnetic Materials, Sep. 2017, 8 pages.
Morch et al. "Structure and Magnetic properties of W-type hexaferrites," 2019, IUCRJ, pp. 492-499, vol. 6.
Mou, Fangzhi et al., "Oriented Contraction: a Facile Nonequilibrium Heat-Treatment Approach for Fabrication of Maghemite Fiber-in-Tube and Tube-in-Tube Nanostructures", Langmuir 2010, 26 (19), pp. 15580-15585.
Mu et al., "Improvement of high-frequency characteristics of Z-type hexaferrite by dysprosium doping", Journal of Applied Physics, 109, 123925, 2011, 6 pages.
Narayanasamy et al. "Influence of mechanical milling and thermal annealing on electrical and magnetic properties of nanostructured Ni—Zn and cobalt ferrites", Bulletin of Materials Science, vol. 31, No. 3 Jun. 1, 2008; pp. 373-380.
Ohnuma et al., "Soft Magnetic Properties of FeN/FeBN Multilayers," Journal on Magnetics, Nov. 1992, pp. 896-901, vol. 7 No. 11.
Ohnuma et al., "Soft Magnetic Multilayers for Micromagnetic Devices," Journal of Magnetism and Magnetic Materials, 1993, pp. 556-562, vol. 126.
Pal et al.; "Synthesis and magnetic properties of gold coated iron oxide nanoparticles"; Journal of Applied Physics 105; 07B504 (2009); 4 pgs.
Park et al. "Design of Wide bandwidth microwave absorber with Ferrite composites of broad magnetic loss specturm," Advanced Materials Engineering, 2015.
Pasko et al. "Magnetic and Structural characterization of nanosized BaCoxZn2—xFe16O27 hexaferrite in the vicinity of spin reorientation transition," 2011, Journal of Physics: Conference Series 303.
Pullar, "Hexagonal Ferrites: a Review of the synthesis, properties and application of hexaferrite ceramics," Mar. 2012, Progress in Material Science, vol. 57, No. 7, pp. 1191-1334.
Sahoo et al. Enhanced Magnetoelectricity in Bismuth Substituted SrFe12O19 Hexaferrite, Aug. 2019, Journal of Applied Physics, vol. 126, No. 7.
Sahu et al.; "Influence of excess Fe accumulation over the surface of FePt nanoparticles: Structural and magnetic properties"; Journal of Applied Physics 113; 134303 (2013); 1 pg Abstract only.
Sepelak et al.; "Nanocrystalline Nickel Ferrite, NiFe2O4: Mechanosynthesis, Nonequilibrium Cation Distribution, Canted Spin Arrangement, and Magnetic Behavior"; J.Phys.Chem. C; 111; pp. 5026-5033; (2007).
Sepelak et al.; "Structural and Magnetic Properties of Nanosize Mechanosynthesized Nickel Ferrite"; Jounral of Magnetism and Magnetic Materials; 272-276; pp. 1616-1618; (2004).
Singh et al. "Static Magnetic Properties of Co and Ru substituted Ba—Sr ferrite," 2008, Materials Research Bulletin, pp. 176-184, vol. 43.
Thakur et al, "Low-loss Spinel Nanoferrite with Matching Permeability and Permittivity in the Ultrahigh Frequency Range," Journal of Applied Physics • Jul. 2010, vol. 108.
Thanh Ba Do; "High Temperature Composite Materials and Magnetodielectric Composites for Microwave Application"; Dissertation; University of Michigan; 2010; 223 pages.
Wu et al.; "Studies of high-frequency magnetic permeability of rod-shaped CrO2 nanoparticles"; Phys. Stat. Sol. (a) 204; No. 3; pp. 755-762; 2007.
Yang, Guo-Min, et al., "Miniaturized Patch Antennas with Ferrite/Dielectric/Ferrite Magnetodielectric Sandwich Substrate", Piers Online, vol. 7, No. 7, (Jan. 1, 2011), pp. 609-612.
Yang, Guo-Min, et al., "Novel Compact and Low-Loss Phase Shifters With Magnetodielectric Disturber", IEEE Microwave and Wireless Components Letters, vol. 21, No. 5, (May 1, 2011); pp. 240-242.
Zaher et al.; "Osmotically driven drug delivery through remote-controlled magnetic nanocomposite membranes"; Biomicrofluidics 9; 054113 (2015); 17 pgs.
Brando et al., "Microwave Electromagnetic Characteristics of New Substituted M-Hexaferrites BaFe12—2xAxMexO19 (A=Ru, Ir ; Me=Co, Zn)", Journal De Physique IV France, Mar. 1997.
Lee et al. "Figure of merit of X-type hexaferrite (Ba2Co2Fe28O46) for mobile antenna applications", Microwave and Optical Technology Letters, vol. 60, Issue 3, Feb. 5, 2018, https://doi.org/10.1002/mop.31053.
Lee et al. "Role of Small Permeability in Gigahertz Ferrite Antenna Performance," IEEE Magnetics Letter, 2013, vol. 4.
Li et al. "High-frequency magnetic properties of W-type barium-ferrite BaZn2—xCoxFe16O27 composites", Journal of Applied Physics 94, 5918 (2003): https://doi.org/10.1063/1.1618945.
Li et al., "High-Frequency Properties and Attenuation Characteristics of WBa Hexaferrite Composites with Doping of Varius Oxides," Transactions of Magnetics, Feb. 2009, pp. 670-677, vol. 45 No. 2.
Li et al; "Static and Dynamic Magnetic Properties of Co2Z Barium Ferrite Nanoparticle Composites"; Journal of Materials Science, 40, pp. 719-723 (2005).
SU et el., "Low Loss Factor Co2Z Ferrite Composites with Equivalent Permittivity and Permeability for Ultra-high Frequency Applications," Applied Physics Letters, Aug. 2014, vol. 105 No. 062402.
Xu et al., "Structural, dielectric and magnetic properties of Nd-doped Co2Z-type hexaferrites", Jounal of Alloys and Compounds, 509, 2011, pp. 4290-4294.
Carvalheiras et al. "Synthesis of red mud derived M-type barium hexaferrites with tuneable coercivity", Ceramics International, vol. 46, No. 5, Nov. 7, 2019, pp. 5757-5764, XP086001988.
Li, Qifan. Development of Magnetodielectric Materials with Low Loss and High Snoek's Product for Microwave Applications, Ph.D.

(56) References Cited

OTHER PUBLICATIONS

Dissertation to The Department of Electrical and Computer Engineering, Northeastern Univ., Boston, MA, Dec. 2020, 150 pgs.
You, Jae-Hyoung, et al. Magnetic Properties of Zn-substituted Y-type hexaferrites, $Ba_2Zn_xFe_2$—$xFe_{12}O_{22}$, Journal of Magnetism and Magnetic Materials, 471, Feb. 1, 2019; 255-261.
International Search Report and Written Opinion for International Application No. PCT/US2021/031006 filed May 6, 2021; Date of mailing: Jul. 15, 2021; 14 pages.
Kim, Chul Sung, et al. "Effects of $In^{3+}$ site occupancy on the magnetic properties of M-type strontium hexaferrites," AIP Advances, American Institute of Physics, vol. 10, No. 1, Jan. 17, 2020.
Zhen et al.; "Microwave absorption properties of $FeNi_3$ submicrometre spheres and $SiO_2$@$FeNi_3$ core-shell structures"; J. Phys. D: Appl. Phys. 43; Jun. 3, 2010; 7 pages.
Kristiantoro et al., "Magnetic properties of cobalt ferrite synthesized by mechanical alloying", from AIP Conf 1964, 020003 (2018) Published Online May 15, 2018; 5 pages.

\* cited by examiner

M-TYPE HEXAFERRITE HAVING A PLANAR ANISOTROPY

CROSS REFERENCE TO RELATED APPLICATIONS

This application is a National Stage application of PCT/US2021/031006, filed May 6, 2021, which claims the benefit of U.S. Provisional Application No. 63/021,295 filed May 7, 2020, both of which are incorporated by reference in their entirety herein.

BACKGROUND

The disclosure is directed to a hexaferrite that can have a planar anisotropy.

Improved performance and miniaturization are needed to meet the ever-increasing demands of devices used in very high frequency (VHF) applications, which are of particular interest in a variety of commercial and defense related industries. As an important component in radar and modern wireless communication systems, antenna elements with compact sizes are constantly being developed. It has been challenging however to develop ferrite materials for use in such high frequency applications as most ferrite materials exhibit relatively high magnetic loss at high frequencies.

In general, hexagonal ferrites, or hexaferrites, are a type of iron-oxide ceramic compound that has a hexagonal crystal structure and exhibits magnetic properties. Several types of families of hexaferrites are known, including Z-type ferrites, $Ba_3Me_2Fe_{24}O_{41}$, and Y-type ferrites, $Ba_2Me_2Fe_{12}O_{22}$, where Me can be a small 2+ cation such as Co, Ni, or Zn, and Sr can be substituted for Ba. Other hexaferrite types include M-type ferrites ($(Ba,Sr)Fe_{12}O_{19}$), W-type ferrites ($(Ba,Sr)Me_2Fe_{16}O_{27}$), X-type ferrites ($(Ba,Sr)_2Me_2Fe_{28}O_{46}$), and U-type ferrites ($(Ba,Sr)_4Me_2Fe_{36}O_{60}$).

Hexaferrites with a high magnetocrystalline anisotropy field are good candidates for gigahertz antenna substrates because they have a high magnetocrystalline anisotropy field and thereby a high ferromagnetic resonance frequency. $Co_2Z$ hexaferrite ($Ba_3Co_2Fe_{24}O_{41}$) materials have been developed for some antenna applications. However, $Co_2Z$ hexaferrite has disadvantages such as a complex phase transformation. On the other hand, pure M-type hexaferrite (for example, $M'Fe_{12}O_{19}$, where M' can be Ba, Pb, or Sr) has a simple crystal structure that is thermodynamically stable. Therefore, the M-type hexaferrite can be produced at a relatively low temperature of around 900° C. However, pure M-type hexaferrites are generally magnetically hard and show low permeability due to their high magnetocrystalline anisotropy. For at least this reason, M-type hexaferrites are not typically used for GHz antenna applications. Improved M-type ferrites are therefore desired.

BRIEF SUMMARY

Disclosed herein is a M-type hexaferrite.

In an aspect, an M-type ferrite comprises an element Me comprising at least one of Ba, Sr, or Pb; an element Me' comprising at least one of Ti, Zr, Ru, or Ir; and an element Me" comprising at least one of In or Sc.

In another aspect, an article comprises an M-type ferrite that comprises an element Me comprising at least one of Ba, Sr, or Pb; an element Me' comprising at least one of Ti, Zr, Ru, or Ir; and an element Me" comprising at least one of In or Sc.

In yet another aspect, a method of making a ferrite comprises milling ferrite precursor compounds comprising oxides of at least Co, Fe, Me, Me', and Me" to form an oxide mixture; wherein Me comprises at least one of Ba, Sr, or Pb; Me' is at least one of Ti, Zr, Ru, or Ir; and Me" is at least one of In or Sc; and calcining the oxide mixture in an oxygen or air atmosphere to form the ferrite.

The above described and other features are exemplified by the following FIGURE, detailed description, and claims.

BRIEF DESCRIPTION OF THE DRAWING

The following FIGURE is an exemplary embodiment, which is provided to illustrate the present disclosure. The FIGURE is illustrative of the examples, which are not intended to limit devices made in accordance with the disclosure to the materials, conditions, or process parameters set forth herein.

DETAILED DESCRIPTION

Attempts at modifying the magnetocrystalline anisotropy of M-phase hexaferrites have included mixing pure BaM hexaferrites with those having a c-plane anisotropy. These attempts though have not proven effective though due to the extremely large uniaxial anisotropy field of 17 kilooersted of the pure BaM hexaferrites.

It was discovered that an M-type hexaferrite (also referred to herein as an M-type ferrite) that includes two or more modifying elements results in a composition with easily tunable magnetic properties. The M-type ferrite takes advantage of the combination of a planar hexagonal M-type ferrite with planar easy (c-plane) magnetization and a uniaxial M-type ferrite with a low magnetic anisotropy in order to tailor the figure of merit and Snoek product of the resultant hexaferrite. It is believed from a number of experiments that substitution of an amount of ferrite with an amount of at least one of indium or scandium (uniaxial magnetic structure) can reduce the uniaxial magnetocrystalline anisotropy and that substitution of an amount of the ferrite with a cobalt complex, for example, at least one of combined cobalt-titanium or cobalt-zirconium (c-plane magnetic structure) can tailor the magnetic structure from uniaxial to an at least partially planar anisotropy or cone-anisotropy.

While the crystallographic structure of the M-type ferrite is not explicitly known, it is believed without wishing to be bound by theory that the M-type ferrite can include at least a first magnetic structure having a c-plane magnetocrystalline anisotropy (herein also referred to as the c-plane magnetic structure) and a second magnetic structure having a uniaxial or c-axis anisotropy (herein also referred to as the uniaxial magnetic structure). Conversely, it is also possible that the crystallographic structure of the M-type ferrite throughout the M-type hexaferrite can be the same, whereas the lattice parameters can be different. In other words, while the M-type ferrite can have two different magnetic anisotropies, it may not be possible to necessarily separate the magnetic structure or the crystal structure of the M-type ferrite. The final structure can be a solid solution of two or more ferrites or it can be a distinguishable dual-phase, but entangled in each other in any fashion. Therefore, it is noted that the M-type ferrite used herein can include a ferrite with distinguishable morphologies in crystal or magnetic structure, a solid solution of the ferrite, a single phase of the M-type ferrite, or any combination, or the like, thereof.

The M-type ferrite can comprise an element Me comprising at least one of Ba, Sr, or Pb; an element Me' comprising at least one of Ti, Zr, Ru, or Ir; and an element Me'' comprising at least one of In or Sc. The M-type ferrite can have the formula $Me(CoMe')_x(Me'')_yFe_{12-2x-y}O_{19}$, wherein Me is at least one of Ba, Sr, or Pb; Me' is at least one of Ti, Zr, Ru, or Ir; Me'' is at least one of In or Sc; x is 0.8 to 1.3; and y is 0.01 to 12, or 0.01 to 6. The M-type ferrite can have the formula $(Me(CoMe')_xFe_{12-2x}O_{19})z(MeMe''_yFe_{12-y}O_{19})$, wherein z can be 0.005 to 2, or 0.005 to 0.5, or 0.01 to 0.15.

The M-type ferrite can have a c-plane magnetocrystalline anisotropy and a uniaxial magnetocrystalline anisotropy.

The M-type ferrite can comprise a c-plane magnetic structure. The c-plane magnetic structure can comprise at least one of cobalt-titanium, cobalt-zirconium, cobalt-ruthenium, or cobalt-iridium. The c-plane magnetic structure can comprise at least one of cobalt-titanium or cobalt-zirconium. The c-plane magnetic structure can have the formula of $Me(CoMe')_xFe_{12-2x}O_{19}$, wherein Me is at least one of Ba, Sr, or Pb; Me' is at least one of Ti, Zr, Ru, or Ir, and x is 0.8 to 1.3. The c-plane magnetic structure can have the formula of $Ba(CoTi)_xFe_{12-2x}O_{19}$, wherein x is 0.8 to 1.3.

The M-type ferrite can comprise a uniaxial magnetic structure. In the uniaxial magnetic structure, at least some of the $Fe^{3+}$ can be exchanged for at least one of $In^{3+}$ or $Sc^{3+}$, while still retaining easy magnetization along with c-axis. The uniaxial magnetic structure can have the formula $Me(Me'')_yFe_{12-y}O_{19}$, wherein Me is defined above; Me'' is at least one of In or Sc; and y is 0.01 to 12, or 0.01 to 6. The uniaxial magnetic structure can have the formula $Ba(In, Sc)_yFe_{12-y}O_{19}$, wherein y can be 0.01 to 6.

The M-type ferrite can have at least one of a high permeability ($\mu'$), a low magnetic loss ($\tan \delta_\mu$), a high resonance frequency, and a high figure of merit (FOM as defined by $\mu'/\tan \delta_\mu$). The permeability of the ferrite can be greater than or equal to 37.5, or greater than or equal to 40, or 40 to 80 at a frequency of 200 megahertz (MHz). The magnetic loss tangent of the ferrite can be less than or equal to 0.8, or less than or equal to 0.1, or 0.001 to 0.3 at a frequency of 200 megahertz. The figure of merit of the ferrite can be greater than or equal to 50, or greater than or equal to 80, or 50 to 90 at a frequency of 200 megahertz. The operating frequency of the ferrite can be 30 to 300 megahertz, or 50 to 200 megahertz. The Snoek product of the ferrite can be greater than or equal to 12 gigahertz, or greater than or equal to 15 gigahertz, or 15 to 30 gigahertz at over the frequency range of 1 to 300 megahertz. These values can be manipulated by changing a ratio of the c-plane magnetic structure and the uniaxial magnetic structure.

A mole ratio of the c-plane magnetic structure to the uniaxial magnetic structure can be 1:0.005 to 1:2; or 1:0.005 to 1:0.5, or 1:0.005 to 0.13; wherein the mole ratio is defined by the moles of $Me(CoMe')_xFe_{12-2x}O_{19}$ relative to the moles of $Me(Me'')_yFe_{12-y}O_{19}$.

The crystalline structure of the M-type ferrite can have an average grain size of 1 to 100 micrometers, or 5 to 50 micrometers. As used herein the average grain size is measured using at least one of transmission electron microscopy or field emission scanning electron microscopy.

The M-type ferrite can comprise an element Me comprising at least one of Ba, Sr, or Pb; an element Me' comprising at least one of Ti, Zr, Ru, or Ir; and an element Me'' comprising at least one of In or Sc. The M-type ferrite can have the formula $Me(CoMe')_x(Me'')_yFe_{12-2x-y}O_{19}$, wherein 0.8 to 1.3 and y is 0.01 to 12, or 0.01 to 6. The M-type ferrite can have the formula $(Me(CoMe')_xFe_{12-2x}O_{19})z(MeMe''_yFe_{12-y}O_{19})$, wherein z can be 0.005 to 2, or 0.005 to 0.5, or 0.01 to 0.15. The M-type ferrite can comprise a c-plane magnetic structure having a c-plane magnetocrystalline anisotropy and having the formula $Me(CoMe')_xFe_{12-2x}O_{19}$, wherein Me is at least one of Ba, Sr, or Pb; Me' is at least one of Ti, Zr, Ru, or Ir; and x is 0.8 to 1.3. The M-type ferrite can comprise a uniaxial magnetic structure having a uniaxial magnetocrystalline anisotropy and having the formula $Me(Me'')_yFe_{12-y}O_{19}$, wherein Me is defined above; Me'' is at least one of In or Sc; and y is 0.01 to 12, or 0.01 to 6. The c-plane magnetic structure can have the formula of $Ba(CoTi)_xFe_{12-2x}O_{19}$, wherein x is 0.8 to 1.3. The uniaxial magnetic structure can have the formula $Ba(In, Sc)_yFe_{12-y}O_{19}$, wherein y is 0.01 to 6. A mole ratio of the c-plane magnetic structure to the uniaxial magnetic structure can be 1:0.005 to 1:2; or 1:0.005 to 1:0.5. The M-type ferrite can be in the form of a solid-solution. The M-type ferrite can have an average grain size is of 1 to 100 micrometers, or 5 to 50 micrometers as measured using transmission electron microscopy or field emission scanning electron microscopy.

The M-type ferrite can be prepared using any suitable method. Generally, the M-type ferrite can be formed by forming a mixture comprising the precursor compounds including oxides of at least Co, Fe, Me, Me', and Me''. The precursor compounds can comprise at least $MeCO_3$, $Co_3O_4$, $Me'_2O_3$, and $Me''O_3$. The oxides can have an average particle size of 3 to 50 micrometers. The mixture can then be milled to form an oxide mixture. The milling can comprise wet milling or dry milling the oxide mixture. The milling of the precursor compounds can comprise milling for less than or equal to 3 hours, or 0.5 to 2 hours. The milling can comprise milling at a milling speed of less than or equal to 400 revolutions per minute (rpm), or 200 to 350 rpm.

Conversely, two or more oxide mixtures can be formed from separate precursor compositions. For example, a first oxide mixture can be formed by milling precursor compounds including oxides of at least Co, Fe, Me, and Me'; and a second oxide mixture can be formed by milling precursor compounds including oxides of at least Fe, Me, Me''.

The oxide mixture(s) can be calcined to form calcined ferrite(s). If more than one oxide mixture is formed, then each oxide mixture independently can be calcined to form their respective calcined ferried. If more than one oxide mixture is formed, then they can be combined and mixed prior to calcining. The calcining can occur at a calcination temperature of 800 to 1,300 degrees Celsius (° C.), or 800 to 1,000° C. The calcining can occur for a calcination time of 0.5 to 20 hours, 1 to 10 hours, or 2 to 5 hours. The calcining can occur in air or oxygen. The ramping temperature up to and down from the calcining temperature can each independently occur at a ramp rate of 1 to 5° C. per minute.

The calcined ferrite(s) can be ground and screened to form coarse particles. If more than one calcined ferrite is formed, then they can be combined prior to the crushing or the screening. The coarse particles can be ground to a size of 0.1 to 20 micrometers, or 0.1 to 10 micrometers. The particles can be ground, for example, in a wet-planetary ball mill by mixing for 2 to 10 hours, or 4 to 8 hours at a milling speed of less than or equal to 600 rpm, or 400 to 500 rpm. The milled mixture can optionally be screened, for example, using a 10 to 300# sieve. The milled mixture can be mixed with a polymer such as poly(vinyl alcohol) to form granules. The granules can have an average particle size of 50 to 300 micrometers. The milled mixture can be formed, for example, by compressing at a pressure of 0.2 to 2 megatons per centimeter squared. The milled mixture, either particulate or formed, can be post-annealed at an annealing temperature of 900 to 1,300° C., or 1,000 to 1,300° C. The annealing can occur for 1 to 20 hours, or 5 to 12 hours. The annealing can occur in air or oxygen. The ferrite can be in the form of a solid-solution depending on the ratio of the c-plane magnetic structure and the uniaxial magnetic structure and on the sintering conditions.

The final M-type ferrite can be in the form of particulates (for example, having a spherical or irregular shape) or in the form of platelets, whiskers, flakes, etc. A particle size of the particulate M-type ferrite can be 0.5 to 50 micrometers, or 1 to 10 micrometers. Platelets of the M-type ferrite can have an average maximum length of 0.1 to 100 micrometers and an average thickness of 0.05 to 1 micrometer.

The M-type ferrite particles can be used to make a composite, for example, comprising the M-type ferrite and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly(ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N- or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) and polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), and the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted and mono-N- or di-N—($C_{1-8}$ alkyl)acrylamides), polyolefins (for example, polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example, ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (e.g., ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g., poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl) acrylate, a ($C_{1-6}$ alkyl)methacrylate, acrylonitrile, vinyl acetate, allyl acetate, triallyl cyanurate, triallyl isocyanurate, or acrylamide.

The polymer can comprise at least one of a fluoropolymer (for example, polytetrafluoroethylene (PTFE)) or a polyolefin (for example, linear low density polyethylene (LLDPE)).

The M-type ferrite composite can comprise 5 to 95 volume percent, or 50 to 80 volume percent of the M-type ferrite based on the total volume of the M-type ferrite composite. The M-type ferrite composite can comprise 5 to 95 volume percent, or 20 to 50 volume percent of the polymer based on the total volume of the M-type ferrite composite. The M-type ferrite composite can be formed by compression molding, injection molding, reaction injection molding, laminating, extruding, calendering, casting, rolling, or the like. The composite can be free of a void space.

As used herein, the magnetic permeability of ferrite samples is measured by Impedance analyzer (E4991B) with a 16454A fixture over a frequency of 1 MHz to 1 GHz. The permeability is the complex permeability, whereas each of the real and imaginary components of the complex permeability stand for the relative permeability and the magnetic loss, respectively.

An article can comprise the M-type ferrite. The article can be an antenna or an inductor core. The article can be for use in the 30 to 300 megahertz frequency range, or 50 to 200 megahertz frequency range. The article can be used for a variety of devices operable within the ultrahigh frequency range, such as a high frequency or microwave antenna, filter, inductor, circulator, or phase shifter. The article can be an antenna, a filter, an inductor, a circulator, or an EMI (electromagnetic interference) suppressor. Such articles can be used in commercial and military applications, weather radar, scientific communications, wireless communications, autonomous vehicles, aircraft communications, space communications, satellite communications, or surveillance.

The following examples are provided to illustrate the present disclosure. The examples are merely illustrative and are not intended to limit devices made in accordance with the disclosure to the materials, conditions, or process parameters set forth therein.

EXAMPLES

Example 1

Oxide mixtures were prepared by mixing $BaCO_3$, $Co_3O_4$, $TiO_2$, $Fe_2O_3$, and optionally $In_2O_3$ in amounts to form the M-type hexaferrite compositions as shown in Table 1. The oxide mixtures were mixed in a wet-plenary ball mill for two hours at 350 revolutions per minute (rpm). The mixture was then calcined at a temperature of 1,150° C. for a soak time of 4 hours in air to form the M-type ferrite compositions.

The M-type hexaferrite compositions were then crushed and screened through 40# sieve to form coarse particles. The coarse particles were ground down to 0.5 to 10 micrometers in a wet-planetary ball mill for six hours at 450 rpm. The granulated ferrite was mixed with 0.5 to 5 wt % of poly (vinyl alcohol) and sieved in a 40# sieve. The sieved material was then compressed at a pressure of 1 megaton per centimeters squared to form ferrite green bodies having a toroid structure with an outer diameter of 18 millimeters (mm), an inner diameter of 10 mm, and a thickness of 3 to 3.5 mm. The green body toroids were post-annealed 1,200° C. for 20 hours in air using ramping and cooling rate of 3 degrees Celsius per minute (° C./min). The compositions of the resultant M-type ferrite compositions had the formula $(Ba_{1.1-x}(CoTi)_{1.2}Fe_{9.6-12.9x}O_{19})$ $z(BaInFe_{11.9}O_{19})$, where the values of x are shown in Table 1.

TABLE 1

| Example | 1 | 2 | 3 | 4 | 5 |
|---|---|---|---|---|---|
| z | 0 | 0.01 | 0.05 | 0.10 | 0.15 |
| Frequency of 50 MHz | | | | | |
| µ' | 43 | 37.7 | 40 | 39.1 | 39.9 |
| $\tan\delta_\mu$ | 0.05 | 0.035 | 0.046 | 0.047 | 0.061 |
| FOM | 860 | 1077 | 870 | 831 | 653 |
| Frequency of 100 MHz | | | | | |
| µ' | 48.5 | 41 | 44.4 | 43.5 | 44.8 |
| $\tan\delta_\mu$ | 0.174 | 0.081 | 0.123 | 0.139 | 0.169 |
| FOM | 279 | 506 | 361 | 313 | 265 |
| Frequency of 200 MHz | | | | | |
| µ' | 37.3 | 43.1 | 40.1 | 37.9 | 35.5 |
| $\tan\delta_\mu$ | 0.8 | 0.521 | 0.664 | 0.693 | 0.803 |
| FOM | 47 | 83 | 60 | 55 | 44 |
| SP (GHz) | 13 | 12.8 | 12.7 | 12.2 | 12.1 |

Figure 1:
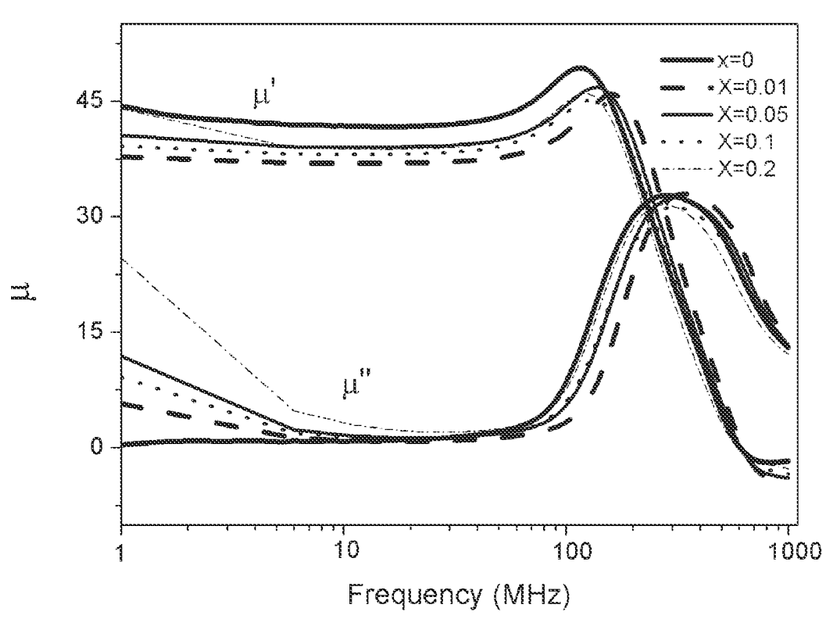
The FIGURE is a graphical illustration of the magnetic properties of the compositions of Examples 1-5.

The magnetic permeability and the magnetic loss of the ferrites of Examples 1-5 were measured using an Impedance analyzer (E4991B) with a 16454A fixture over a frequency of 1 megahertz (MHz) to 1 gigahertz (GHz). The Snoek product (SP), the magnetic properties a 50 MHz, 100 MHz, and 200 MHz are shown in Table 1 and the magnetic permeability, magnetic loss, and the figure of merit (FOM) with frequency as indicated are shown in FIG. 1.

The data in Table 1 clearly shows that the presence of the c-axis phase in Examples 2-4 results in a desirable increase in the figure of merit at frequencies from 50 to 200 MHz relative to that of Example 1.

Set forth below are non-limiting aspects of the present disclosure.

Aspect 1A: A ferrite, wherein the ferrite comprises: an element Me comprising at least one of Ba, Sr, or Pb; an element Me' comprising at least one of Ti, Zr, Ru, or Ir; and an element Me" comprising at least one of In or Sc; and wherein the ferrite is an M-type ferrite.

Aspect 1B: A ferrite, wherein the ferrite comprises: a c-plane magnetic structure having a c-plane magnetocrystalline anisotropy and having the formula $Me(CoMe')_x Fe_{12-2x}O_{19}$, wherein Me is at least one of Ba, Sr, or Pb; Me' is at least one of Ti, Zr, Ru, or Ir; and x is 0.8 to 1.3; and a uniaxial magnetic structure having a uniaxial magnetocrystalline anisotropy and having the formula $Me(Me'')_y Fe_{12-y}O_{19}$, wherein Me is defined above; Me" is at least one of In or Sc; and y is 0.01 to 12, or 0.01 to 6. The c-plane phase can have the formula of $Ba(CoTi)_x Fe_{12-2x}O_{19}$, wherein x is 0.8 to 1.3. The uniaxial phase can have the formula $Ba(In, Sc)_y Fe_{12-y}O_{19}$, wherein y is 0.01 to 6. A mole ratio of the c-plane phase to the uniaxial phase can be 1:0.005 to 1:2; or 1:0.005 to 1:0.5.

Aspect 2: The ferrite of any one of the preceding aspects, wherein the ferrite has the formula $Me(CoMe')_x(Me'')_y Fe_{12-2x-y}O_{19}$, wherein 0.8 to 1.3 and y is 0.01 to 12, or 0.01 to 6; or wherein the ferrite has the formula $(Me(CoMe')_x Fe_{12-2x}O_{19})z(MeMe''_y Fe_{12-y}O_{19})$, wherein z can be 0.005 to 2, or 0.005 to 0.5, or 0.01 to 0.15.

Aspect 3: The ferrite of any one of the preceding aspects, wherein the ferrite comprises at least one of a c-plane magnetic structure having a c-plane magnetocrystalline anisotropy and having the formula $Me(CoMe')_x Fe_{12-2x}O_{19}$, wherein Me is at least one of Ba, Sr, or Pb; Me' is at least one of Ti, Zr, Ru, or Ir; and x is 0.8 to 1.3; or a uniaxial magnetic structure having a uniaxial magnetocrystalline anisotropy and having the formula $Me(Me'')_y Fe_{12-y}O_{19}$, wherein Me is defined above; Me" is at least one of In or Sc; and y is 0.01 to 12, or 0.01 to 6. The c-plane magnetic structure can have the formula of $Ba(CoTi)_x Fe_{12-2x}O_{19}$, wherein x is 0.8 to 1.3. The uniaxial magnetic structure can have the formula $Ba(In, Sc)_y Fe_{12-y}O_{19}$, wherein y is 0.01 to 6.

Aspect 4: The ferrite of any of the preceding aspects, wherein a mole ratio of the c-plane phase to the uniaxial phase is 1:0.005 to 1:2; or 1:0.005 to 1:0.5.

Aspect 5: The ferrite of any of the preceding aspects, wherein the ferrite is in the form of a solid-solution.

Aspect 6: The ferrite of any of the preceding aspects, wherein the ferrite has an average grain size is of 1 to 100 micrometers, or 5 to 50 micrometers as measured using transmission electron microscopy or field emission scanning electron microscopy.

Aspect 7: The ferrite of any of the preceding aspects, wherein the ferrite has a permeability of greater than or equal to 37.5, or greater than or equal to 40, or 40 to 80 at a frequency of 200 megahertz.

Aspect 8: The ferrite of any of the preceding aspects, wherein the ferrite has a figure of merit of greater than or equal to 50, or greater than or equal to 80, or 50 to 90 at a frequency of 200 megahertz.

Aspect 9: The ferrite of any of the preceding aspects, wherein the ferrite has a magnetic loss tangent $\tan\delta_\mu$ of less than or equal to 0.8, or less than or equal to 0.1, or 0.001 to 0.3 at a frequency of 200 megahertz.

Aspect 10: The ferrite of any of the preceding aspects, wherein the ferrite has a Snoek product of greater than or equal to 12 gigahertz, or greater than or equal to 15 gigahertz at over the frequency range of 1 to 300 megahertz.

Aspect 11: A composite comprising a polymer and the ferrite of any of the preceding aspects.

Aspect 12: The composite of Aspect 11, wherein the polymer comprises at least one of a fluoropolymer or a polyolefin.

Aspect 13: An article comprising the ferrite composition of any of Aspects 1 to 10 or the composite of any one of Aspects 11 to 12.

Aspect 14: The article of Aspect 13, wherein the article is an antenna, a filter, an inductor, a circulator, or an EMI suppressor.

Aspect 15: A method of making a dual-phase ferrite (optionally of any of Aspects 1 to 10) comprising: milling ferrite precursor compounds comprising oxides of at least Co, Fe, Me, Me', and Me" to form an oxide mixture; wherein Me comprises at least one of Ba, Sr, or Pb; Me' is at least one of Ti, Zr, Ru, or Ir; and Me" is at least one of In or Sc; and calcining the oxide mixture in an oxygen or air atmosphere to form the dual-phase ferrite.

Aspect 16: The method of Aspect 15, wherein the milling the ferrite precursor compounds comprises: milling the ferrite precursor compounds comprising oxides of at least Co, Fe, Me, and Me' to form a first oxide mixture; and milling the ferrite precursor compounds comprising oxides of at least Fe, Me, and Me" to form a second oxide mixture; wherein the calcining comprises separately calcining the first oxide mixture and the second oxide mixture or calcining a mixture comprising the first oxide mixture and the second oxide mixture.

Aspect 17: The method of Aspect 16, wherein the calcining comprises separately calcining the first oxide mixture and the second oxide mixture to form separately calcined mixtures; and the method further comprises mixing the separately calcined mixture to form ferrite.

Aspect 18: The method of any of Aspects 15 to 17, further comprising milling the ferrite.

Aspect 19: The method of any of Aspects 15 to 18, further comprising post-annealing the dual-phase ferrite in an oxygen or air atmosphere after the milling; optionally at an annealing temperature of 900 to 1,300° C., or 1,200 to 1,250° C. for an annealing time of 1 to 20 hours, or 5 to 12 hours.

Aspect 20: The method of any of Aspects 15 to 19, wherein the calcining the calcined ferrite occurs at a calcining temperature of 800 to 1,300° C., or 800 to 1,000° C. for a calcining time of 0.5 to 20 hours, or 1 to 10 hours.

Aspect 21: The method of any of Aspects 15 to 20, further comprising forming a composite comprising the dual-phase ferrite and a polymer.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. The term "combination" is inclusive of blends, mixtures, alloys, reaction products, and the like. Also, "at least one of" means that the list is inclusive of each element individually, as well as combinations of two or more elements of the list, and combinations of at least one element of the list with like elements not named.

The term "or" means "and/or" unless clearly indicated otherwise by context. Reference throughout the specification to "an aspect", "another aspect", "some aspects", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A ferrite, wherein the ferrite comprises:
   an element Me comprising at least one of Ba, Sr, or Pb;
   an element Me' comprising at least one of Ti, Zr, Ru, or Ir; and
   an element Me" comprising at least one of In or Sc; and
   wherein the ferrite is an M-type ferrite, and
   wherein the ferrite has
      an average grain size is of 1 to 100 micrometers, as measured using transmission electron microscopy or field emission scanning electron microscopy,
      a permeability of greater than or equal to 37.5 at a frequency of 200 megahertz,
      a figure of merit of greater than or equal to 50 at a frequency of 200 megahertz,
      a magnetic loss tangent tan $\delta_\mu$ of less than or equal to 0.8 at a frequency of 200 megahertz,
      a Snoek product of greater than or equal to 12 gigahertz over the frequency range of 1 to 300 megahertz, or
      a combination thereof.

2. The ferrite of claim 1, wherein the ferrite is in the form of a solid-solution.

3. The ferrite of claim 1, wherein the ferrite has an average grain size is of 1 to 100 micrometers, as measured using transmission electron microscopy or field emission scanning electron microscopy.

4. The ferrite of claim 1, wherein the ferrite has a permeability of greater than or equal to 37.5 at a frequency of 200 megahertz.

5. The ferrite of claim 1, wherein the ferrite has a figure of merit of greater than or equal to 50 at a frequency of 200 megahertz.

6. The ferrite of claim 1, wherein the ferrite has a magnetic loss tangent tan $\delta_\mu$ of less than or equal to 0.8 at a frequency of 200 megahertz.

7. The ferrite of claim 1, wherein the ferrite has a Snoek product of greater than or equal to 12 gigahertz over the frequency range of 1 to 300 megahertz.

8. A dual-phase ferrite, wherein the dual-phase ferrite comprises:
   a c-plane magnetic structure having a c-plane magnetocrystalline anisotropy and having the formula Me(CoMe')$_x$Fe$_{12-2x}$O$_{19}$, wherein Me is at least one of Ba, Sr, or Pb; Me' is at least one of Ti, Zr, Ru, or Ir; and x is 0.8 to 1.3; and
   a uniaxial magnetic structure having a uniaxial magnetocrystalline anisotropy and having the formula Me(Me")$_y$Fe$_{12-y}$O$_{19}$, wherein Me is defined above; Me" is at least one of In or Sc; and y is 0.01 to 12.

9. The dual-phase ferrite of claim 8, wherein the dual-phase ferrite has the formula (Me(CoMe')$_x$Fe$_{12-2x}$O$_{19}$) (MeMe"$_y$Fe$_{12-y}$O$_{19}$), wherein x is 0.8 to 1.3, y is 0.01 to 12, and z is 0.005 to 2.

10. The dual-phase ferrite of claim 8, wherein the c-plane magnetic structure has the formula of Ba(CoTi)$_x$Fe$_{12-2x}$O$_{19}$, wherein x is 0.8 to 1.3.

11. The dual-phase ferrite of claim 8, wherein the uniaxial magnetic structure has the formula Ba(In)$_y$Fe$_{12-y}$O$_{19}$, wherein y is 0.01 to 6.

12. The dual-phase ferrite of claim 8, wherein a mole ratio of the c-plane magnetic structure to the uniaxial magnetic structure is 1:0.005 to 1:2.

13. A composite comprising a polymer and the ferrite of claim 1.

14. A composite comprising:
   a polymer comprising at least one of a fluoropolymer or a polyolefin; and
   a ferrite comprising
      an element Me comprising at least one of Ba, Sr, or Pb;
      an element Me' comprising at least one of Ti, Zr, Ru, or Ir; and
      an element Me" comprising at least one of In or Sc,
      wherein the ferrite is an M-type ferrite.

15. An article comprising the ferrite composition of claim 1.

16. The article of claim 15, wherein the article is an antenna, a filter, an inductor, a circulator, or an EMI suppressor.

17. A method of making the dual-phase ferrite of claim 8, the method comprising:
   milling ferrite precursor compounds comprising oxides of at least Co, Fe, Me, Me', and Me" to form an oxide mixture; and
   calcining the oxide mixture in an oxygen or air atmosphere to form the dual-phase ferrite.

18. The method of claim 17, wherein the milling the ferrite precursor compounds comprises:
   milling the ferrite precursor compounds comprising oxides of at least Co, Fe, Me, and Me' to form a first oxide mixture; and
   milling the ferrite precursor compounds comprising oxides of at least Fe, Me, and Me" to form a second oxide mixture;
   wherein the calcining comprises separately calcining the first oxide mixture and the second oxide mixture or calcining a mixture comprising the first oxide mixture and the second oxide mixture.

19. The method of claim 18, wherein the calcining comprises separately calcining the first oxide mixture and the second oxide mixture to form separately calcined mixtures; and the method further comprises mixing the separately calcined mixture to form the dual-phase ferrite.

20. The method of claim 17, further comprising post-annealing the ferrite in an oxygen or air atmosphere after the milling.

21. The method of claim 17, wherein the calcining the calcined ferrite occurs at a calcining temperature of 800 to 1,300° C. for a calcining time of 0.5 to 20 hours.

22. A method of forming a composite, comprising:
   forming a dual-phase ferrite according to the process of claim 17; and
   mixing the dual-phase ferrite and a polymer.

* * * * *